US011583899B1

(12) United States Patent
Roy et al.

(10) Patent No.: US 11,583,899 B1
(45) Date of Patent: Feb. 21, 2023

(54) CLEANING STATION FOR ROBOTIC END EFFECTORS

(71) Applicant: Amazon Technologies, Inc., Seattle, WA (US)

(72) Inventors: Sucheta Roy, Puyallup, WA (US); Steven Bradley Buhr, Tacoma, WA (US); Vatsal Mehta, Renton, WA (US); Roland J Menassa, Macomb, MI (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/035,194

(22) Filed: Sep. 28, 2020

(51) Int. Cl.
*B08B 1/00* (2006.01)
*B08B 3/08* (2006.01)
*B25J 19/00* (2006.01)
*B25J 9/16* (2006.01)
*B08B 13/00* (2006.01)

(52) U.S. Cl.
CPC .............. *B08B 3/08* (2013.01); *B08B 1/001* (2013.01); *B08B 13/00* (2013.01); *B25J 9/1679* (2013.01); *B25J 19/0058* (2013.01); *B08B 2203/007* (2013.01)

(58) Field of Classification Search
None
See application file for complete search history.

(56) References Cited

U.S. PATENT DOCUMENTS

| 4,561,902 | A | * | 12/1985 | Lee | B08B 3/12 134/1 |
| 4,745,857 | A | * | 5/1988 | Putnam | B25J 9/0093 101/151 |
| 2004/0231594 | A1 | * | 11/2004 | Edwards | H01L 21/6838 118/719 |
| 2007/0263026 | A1 | * | 11/2007 | Shang | B41J 2/16552 347/22 |
| 2018/0049737 | A1 | * | 2/2018 | Swayze | A61B 17/064 |
| 2019/0299424 | A1 | * | 10/2019 | Curhan | B25J 19/0075 |
| 2020/0284515 | A1 | * | 9/2020 | Cantrell | A23B 7/045 |

FOREIGN PATENT DOCUMENTS

| CN | 107650147 | * | 2/2018 |
| JP | 2010188286 | * | 9/2010 |

OTHER PUBLICATIONS

Translation of CN107650147 by He-yong Liu, published Feb. 2, 2018.*
Translation of JP2010188286 by Miyamoto et al., published Sep. 2, 2010.*

* cited by examiner

*Primary Examiner* — Mikhail Kornakov
*Assistant Examiner* — Ryan L Coleman
(74) *Attorney, Agent, or Firm* — Kilpatrick Townsend & Stockton LLP

(57) ABSTRACT

A robotic arm can clean an end-of-arm tool using a cleaning station. The end-of-arm tool can be positioned at an introduction position with a portion of the end-of-arm tool in contact with a cleaning agent contained within the cleaning station. The end-of-arm tool can be positioned at a scrubbing position with the end-of-arm tool in contact with a cleaning surface. And the end-of-arm tool can be positioned at a drying position for drying of the end-of-arm tool.

20 Claims, 5 Drawing Sheets

CLEANING STATION FOR ROBOTIC END EFFECTORS

BACKGROUND

Modern inventory systems, such as those in mail order warehouses, supply chain distribution centers, airport luggage systems, and custom-order manufacturing facilities, face significant challenges in responding to requests for inventory items. The inventory systems can include robotic manipulators that can engage with and manipulate the items. For example, the robotic manipulators can include an end-of-arm tool with an engagement surface that interacts with the items. However, during manipulation of the items, the engagement surface can become contaminated and may not be able to correctly manipulate the items. The inventory system may need to be stopped for an extended period of time while the engagement surface is repaired or replaced.

BRIEF DESCRIPTION OF THE DRAWINGS

Various embodiments in accordance with the present disclosure will be described with reference to the drawings, in which.

DETAILED DESCRIPTION

Figure 1:
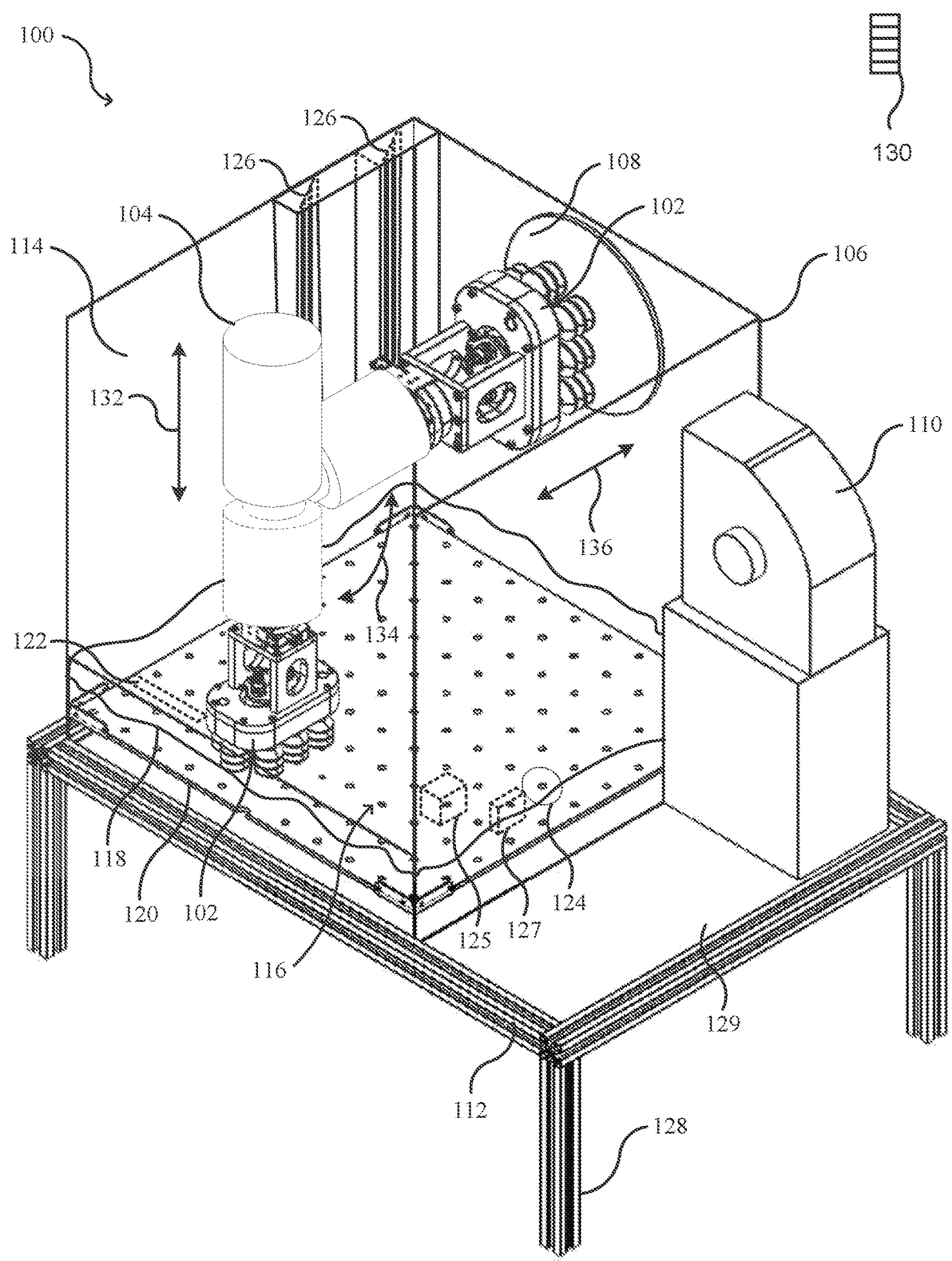
FIG. 1 illustrates a cleaning station, in accordance with embodiments, for cleaning an end-of-arm tool of a robotic arm.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to cleaning of an end-of-arm tool of a robotic arm. The techniques described herein may be implemented by any cleaning system, but particular examples described herein include a cleaning station for automated cleaning of the end-of-arm tool. The robotic arm can position the end-of-arm tool at an introduction position for cleaning of the end-of-arm tool. At the introduction position, the end-of-arm tool can be in contact with a cleaning agent contained within a reservoir of the cleaning station. The robotic arm can remove the end-of-arm tool from the cleaning agent and reposition the end-of-arm tool at a scrubbing position. At the scrubbing position, the end-of-arm tool can be in contact with a cleaning surface of the cleaning station. The robotic arm can move the end-of-arm tool from the cleaning station and reposition the end-of-arm tool at a drying position. At the drying position, the end-of-arm tool can be dried by a dryer of the cleaning station and/or via evaporation of the cleaning agent off of the end-of-arm tool.

Turning now to a particular example, in this example, a robotic arm can be controlled by a computer system. The computer system can include rewritable memory and a processor. The processor can execute instructions stored in the rewritable memory to operate the robotic arm. The robotic arm can have an end-of-arm tool that can engage with items. For example, the end-of-arm tool can include an engagement surface that can engage with the items. The robotic arm can operate in multiple modes, for example, based on instructions received from the rewritable memory. For example, while operating in a manipulation mode, the robotic arm can engage with items and/or while operating in a cleaning mode, the robotic arm can position the end-of-arm tool for cleaning. While in the cleaning mode, the robotic arm can position the end-of-tool adjacent to a cleaning station. The cleaning station can include a cleaning agent, e.g., contained in a reservoir. The robotic arm can position the end-of-arm tool for introduction to or application of the cleaning agent. For example, the robotic arm can immerse the engagement surface in the cleaning agent or otherwise contact the end-of-arm tool with the cleaning agent (e.g., the robotic arm may position the end-of-arm tool for spraying or other wetting of the engagement surface with the cleaning agent). As an additional or alternative operation to introduction of the cleaning agent, the robotic arm can engage the end-of-arm tool with a cleaning surface of the cleaning station, for example, by rubbing the end-of-arm tool against the cloth to knock off debris from the end-of-arm tool. The robotic arm can position the end-of-arm tool at a drying position, e.g., after moving away from contact with the cleaning agent and/or after removing the end-of-arm tool from the cleaning surface. At the drying position, a dryer can dry the end-of-arm tool. For example, the dryer can dry the engagement surface of the end-of-arm tool. After the end-of-arm tool has dried, the robotic arm can operate in the manipulation mode, for example, to engage with items.

While exemplary embodiments are described with reference to items, and the like, the systems and techniques described herein are also applicable to packaging containers (e.g., bags, boxes, totes, envelopes, pouches, sacks, jugs, and/or other suitable containers).

Turning now to the figures, FIG. 1 illustrates a cleaning station 100 for cleaning an end-of-arm tool 102 of a robotic arm 104. The robotic arm 104 can move the end-of-arm tool 102 between various positions around the cleaning station 100. For example, the robotic arm 104 can move the end-of-arm tool 102 between an introduction position, a scrubbing position, and/or a drying position. At the introduction position, the end-of-arm tool 102 can be immersed in a cleaning agent 118. Immersing the end-of-arm tool 102 in the cleaning agent 118 can be or include dipping, wetting, spraying, lowering, dousing, steeping, saturating, rinsing, dunking, submerging, and/or plunging at least a portion of the end-of-arm tool 102 in the cleaning agent 118. At the scrubbing position, the end-of-arm tool 102 can be abraded against a cleaning pad 108. Abrading the end-of-arm tool 102 against the cleaning pad 108 can be or include scrubbing, scouring, rubbing, brushing, sponging, swabbing, wiping, scraping, agitating, and/or engaging at least a portion of the end-of-arm tool 102 against the cleaning pad 108 in some fashion that imparts relative motion therebetween to provide a cleaning effect.

The end-of-arm tool 102 can be or include a tool for engaging and/or manipulating items. In various embodiments, the end-of-arm tool 102 can include one or more suction cups. The suction cups can include a vacuum that can aid in engagement of the end-of-arm tool 102 with the items. The end-of-arm tool 102 can be or include a stamping machine, a soft robot, a rubberized gripper, inflatable bags, and/or any surface that can degrade through repeated use.

The cleaning station 100 can include a reservoir 106, the cleaning pad 108, and/or a dryer 110 positioned on platform 112. The reservoir 106 can include walls 114 that are sized and shaped to allow the robotic arm 104 to position the end-of-arm tool 102 in the reservoir 106. For example, one of walls 114 can have a shorter height than the other walls to create an opening for the robotic arm 104 and/or the end-of-arm tool 102. In some embodiments, one or more of the walls 114 can include features that allow for movement of the robotic arm 104 and/or the end-of-arm tool 102. For example, the walls 114 can include a notch, groove, and/or a similar feature that can be sized and shaped to allow movement of the robotic arm 104 and/or the end-of-arm tool 102. The walls 114 can be or include metal, plastic, glass, wood, and/or a similar material that can be joined together to form the reservoir 106.

The walls 114 can be joined to form a basin 116. The basin 116 can contain the cleaning agent 118. The cleaning agent 118 can be or include a cleaning liquid or cleaning solution that can clean and/or decontaminate the end-of-arm tool 102. For example, the cleaning agent 118 can include solution that cleans an engagement surface of the end-of-arm tool 102. The cleaning agent 118 can be or include water, soap, alcohol, vinegar, bleach, baking soda, particulate, solid, pellets, powder, cleaner, solvent, and/or any similar cleaning agent. In various embodiments, the cleaning agent 118 may be selected based on compatibility specifications provided by a manufacturer of the end-of-arm tool 102, for example.

In various embodiments, a shelf 120 can be positioned in the basin 116, for example, beneath the height of the cleaning agent 118. The shelf 120 can engage with the end-of-arm tool 102 to act as a depth stop for the end-of-arm tool 102. For example, the robotic arm 104 can immerse the end-of-arm tool 102 in the cleaning agent 118 until the end-of-arm tool 102 engages with the shelf 120. The shelf 120 can be positioned to allow only a portion of the end-of-arm tool 102 to be immersed in the cleaning agent 118, for example, the engagement surface of the end-of-arm tool 102. The shelf 120 can include one or more openings that allow the cleaning agent 118 to pass through the shelf 120. For example, cleaning agent 118 can be added and/or removed from the basin 116 by passing through the shelf 120.

In some embodiments, the basin 116 and/or the reservoir 106 can include a heater 122. The heater 122 can be positioned to heat the cleaning agent 118. For example, the heater 122 can be positioned below the surface of the cleaning agent 118 to heat the cleaning agent 118. The heater 122 can heat the cleaning agent 118 to a temperature to aid in the cleaning and/or decontamination of the end-of-arm tool 102. For example, the heater 122 can heat the cleaning agent 118 to a temperature that sterilizes the portion of the end-of-arm tool 102 immersed in the cleaning agent 118. For example, the heater 122 can heat the cleaning agent 118 to a temperature in a range between 15 degrees Celsius and 45 degrees Celsius (e.g., 15 degrees Celsius, 20 degrees Celsius, 30 degrees Celsius, 40 degrees Celsius, or 45 degrees Celsius). The heater 122 can be or include a heating coil, a heating pad, a heat lamp, and/or any suitable heating device.

In some embodiments, the basin 116 can include a drain 124. The drain 124 can be used to remove and/or add cleaning agent 118 to the basin 116. For example, the drain 124 can be used to drain cleaning agent 118 after the end-of-arm tool 102 has been immersed in the cleaning agent 118. New cleaning agent 118 may be pumped through the drain 124 into the basin 116 in preparation for additional cleaning of the end-of-arm tool 102. Although the drain 124 is depicted as a single structure, the drain 124 may correspond to multiple structures, such as an inlet through which fresh cleaning agent 118 may be introduced and an outlet through which used cleaning agent 118 may be removed, or any other combination of structures suitable for accomplishing respective functions of the drain 124.

In some embodiments, a pump 125 can be positioned in the basin 116 to circulate the cleaning agent 118. For example, the pump 125 can be used to create a flow of the cleaning agent 118 in the basin 116. A filter 127 may be included in or adjacent the pump 125, in or adjacent the drain, and/or in any other position within a suitable fluid path to permit use for filtering the cleaning agent 118. The filter 127 can filter the cleaning agent 118 continuously (e.g., the cleaning agent 118 can be continuously pumped through the filter 127) or the filter 127 can filter the cleaning agent 118 after the end-of-arm tool 102 has been removed from the cleaning agent 118 (e.g., after the end-of-arm tool 102 has been moved from the introduction position).

The cleaning pad 108 can be positioned along one or more of the walls 114 for engagement with the end-of-arm tool 102, for example, when the robotic arm 104 positions the end-of-arm tool 102 in the scrubbing position. The cleaning pad 108 can be positioned such that the robotic arm 104 can rotate or otherwise move the end-of-arm tool 102 from the introduction position to the scrubbing position to engage the cleaning pad 108. In various embodiments, the cleaning pad 108 can be positioned such that the robotic arm 104 can position the end-of-arm tool 102 in the scrubbing position with minimal or no additional movement. For example, the cleaning pad 108 can be positioned on a raised surface positioned in the basin 116 such that the robotic arm 104 can engage the end-of-arm tool 102 with the cleaning pad 108 without needing to pivot the end-of-arm tool 102. In some embodiments, the cleaning pad 108 may be positioned beneath the cleaning agent 118. For example, the cleaning pad 108 can be positioned such that when the robotic arm 104 immerses the end-of-arm tool 102 in the cleaning agent 118, the end-of-arm tool 102 can be engaged with the cleaning pad 108.

The cleaning pad 108 can be or include material that aids in the cleaning of the end-of-arm tool 102. For example, the cleaning pad 108 can be or include a microfiber cloth that can be used to the clean the end-of-arm tool 102. The cleaning pad 108 can additionally or alternatively include a scouring pad, a scrubbing pad, a steel wool pad, and/or any suitable material for cleaning the end-of-arm tool 102. In various embodiments, the cleaning pad 108 can be or include material that allows the robotic arm 104 to move the end-of-arm tool 102 against the cleaning pad 108 in a repeating motion. For example, the cleaning pad 108 can be or include material that allows the robotic arm 104 to scrub (e.g., move up or down, left or right, in a circle, and/or in a pattern) the end-of-arm tool 102 against the cleaning pad 108. In some embodiments, the cleaning pad 108 can include a moveable base that can move the cleaning pad 108 relative to the end-of-arm tool 102, for example, to aid in cleaning of the end-of-arm tool 102. For example, the cleaning pad 108 can be moved relative to the end-of-arm tool 102 to scrub the end-of-arm tool 102.

The dryer 110 can aid in drying the end-of-arm tool 102. For example, the dryer 110 can be positioned to blow air into the reservoir 106. The dryer 110 can blow air into the reservoir 106 through one or more openings in the walls 114. The dryer 110 can be positioned to blow air into the reservoir 106 such that the air is blown towards the end-of-arm tool 102 in the drying position. The dryer 110 can be or include a blower, a fan, and/or similar air moving device that can blow air into the reservoir 106. The dryer 110 can include a heater to heat the air prior to blowing the air into the reservoir 106. For example, the dryer 110 can heat the air to decrease the drying time for the end-of-arm tool 102. In some embodiments, the dryer 110 may include a towel or similar non-air based drying components in addition to or in lieu of air-based drying components. For example, similar to the cleaning pad 108, the towel or similar non-air based drying components may be engaged by movement of the robotic arm 104 and/or may include a moveable base to facilitate motion relative to the robotic arm 104. In some embodiments, one or more sensors can be used to determine when the end-of-arm tool 102 is dry. For example, a moisture sensor can be used to determine if the end-of-arm tool 102 is dry. The sensors can additionally or alternatively be or include a timer and/or machine vision. In some embodiments, a suction test can be used to determine when the end-of-arm tool 102 is dry. For example, suction on the end-of-arm tool 102 can be activated to determine if the suction being generated meets a threshold value.

In various embodiments, slats 126 can be positioned in walls 114 to aid in the drying of the end-of-arm tool 102. The slats 126 can allow air to flow into the reservoir 106 toward the end-of-arm tool 102 in the drying position. The slats 126 can additionally or alternatively direct air towards the end-of-arm tool 102 in the drying position. For example, the air can be directed via slats 126 toward the end-of-arm tool 102 and/or by adjusting the orientation of the dryer 110. In some embodiments, the slats 126 can act as an exhaust for the air blown into the reservoir 106 by the dryer 110. For example, the slats 126 can be positioned on a wall 114 opposite the dryer 110 such that the air from the dryer 110 is directed across the reservoir 106. The end-of-arm tool 102 can be positioned between the dryer 110 and the slats 126 in the drying position.

The platform 112 can include or correspond to a support surface 129 and legs 128 for supporting the reservoir 106 and/or the dryer 110. The legs 128 can be or include adjustable legs that can be used to adjust the height of the cleaning station 100. For example, the legs 128 can be adjusted to lower the cleaning station 100 when not in use and/or raise the cleaning station 100 to a height for interacting with the robotic arm 104 during use. In various embodiments, the platform 112 can include or be capable of engaging with a propulsion system that can allow the cleaning station 100 to move around the warehouse environment. For example, the propulsion system can be used to move the cleaning station 100 between various robotic arms 104 positioned in the warehouse environment.

The robotic arm 104 can be or include a robotic device that can move an end-of-arm tool 102 between various positions of a cleaning station 100. The robotic arm 104 can correspond to and/or include, but is not limited to, conveyors, belts, rollers, chains, bands, robotic manipulators, or other conveyance devices. In various embodiments, the robotic arm 104 may be or include any suitable robotic device, for example, a mobile drive unit and/or unmanned aerial vehicle.

The robotic arm 104 can be positioned in a warehouse environment. For example, the robotic arm 104 can be positioned at a stationary point in the warehouse environment or may be moveable around the warehouse environment. The robotic arm 104 can include one or more actuators for moving the robotic arm. For example, the actuators can move the robotic arm 104 along multiple axes. The robotic arm 104 can be moveable along six-axes, although any other suitable number greater than or less than six could alternatively be utilized.

The robotic arm 104 can be in communication with a computer system 130. Computer system 130 can send operating instructions to the robotic arm 104. For example, the computer system 130 can send operating instructions to the robotic arm 104 to operate the robotic arm 104 to move the end-of-arm tool 102 between the introduction position, the scrubbing position, and/or the drying position. The computer system 130 can additionally or alternatively change the operating mode of the robotic arm 104. For example, in a manipulation mode, the robotic arm 104 can control the end-of-arm tool 102 to manipulate items and/or in a cleaning mode, the robotic arm 104 can position the end-of-arm tool 102 in the reservoir 106.

The operating instructions can include instructing the robotic arm 104 to engage the end-of-arm tool 102 with an item (e.g., when the robotic arm 104 is in the manipulation mode of operation). The end-of-arm tool 102 can engage with an item to move the item around the warehouse environment. The operating instructions can include instructing the robotic arm 104 to move the end-of-arm tool 102 to an introduction position. For example, the robotic arm 104 can move the end-of-arm tool 102 along direction 132 to immerse the end-of-arm tool 102 in the cleaning agent 118.

The operating instructions can include instructing the robotic arm 104 to move the end-of-arm tool 102 between the introduction position and the scrubbing position. For example, the robotic arm 104 can pivot along direction 134 to move the end-of-arm tool 102 between the introduction position (as shown in dashed lines) and the scrubbing position (as shown in solid lines). The robotic arm 104 can pivot, for example, 90 degrees between the introduction position and the scrubbing position, however, the robotic arm 104 may pivot more or less than 90 degrees between the introduction position and the scrubbing position. The robotic arm 104 can pivot such that the end-of-arm tool engages with the cleaning pad 108 after pivoting. However, the robotic arm 104 can move the end-of-arm tool 102 along direction 136 after pivoting to engage the end-of-arm tool 102 with the cleaning pad 108.

The operating instructions can include instructing the robotic arm 104 to move the end-of-arm tool 102 between the scrubbing position and the drying position. For example, the robotic arm 104 can move the end-of-arm tool 102 along direction 136 until the end-of-arm tool 102 is disengaged from the cleaning pad 108. However, in the drying position, the end-of-arm tool 102 may remain engaged with the cleaning pad 108. The computer system 130 can be in communication with the dryer 110 and can send operating instructions to the dryer 110 when the end-of-arm tool 102 is in the drying position. For example, the computer system 130 can send operating instructions to automatically turn on the dryer 110 when the end-of-arm tool 102 is positioned in the drying position and can additionally or alternatively send operating instructions to turn off the dryer 110 when the end-of-arm tool 102 is dry.

Figure 2:
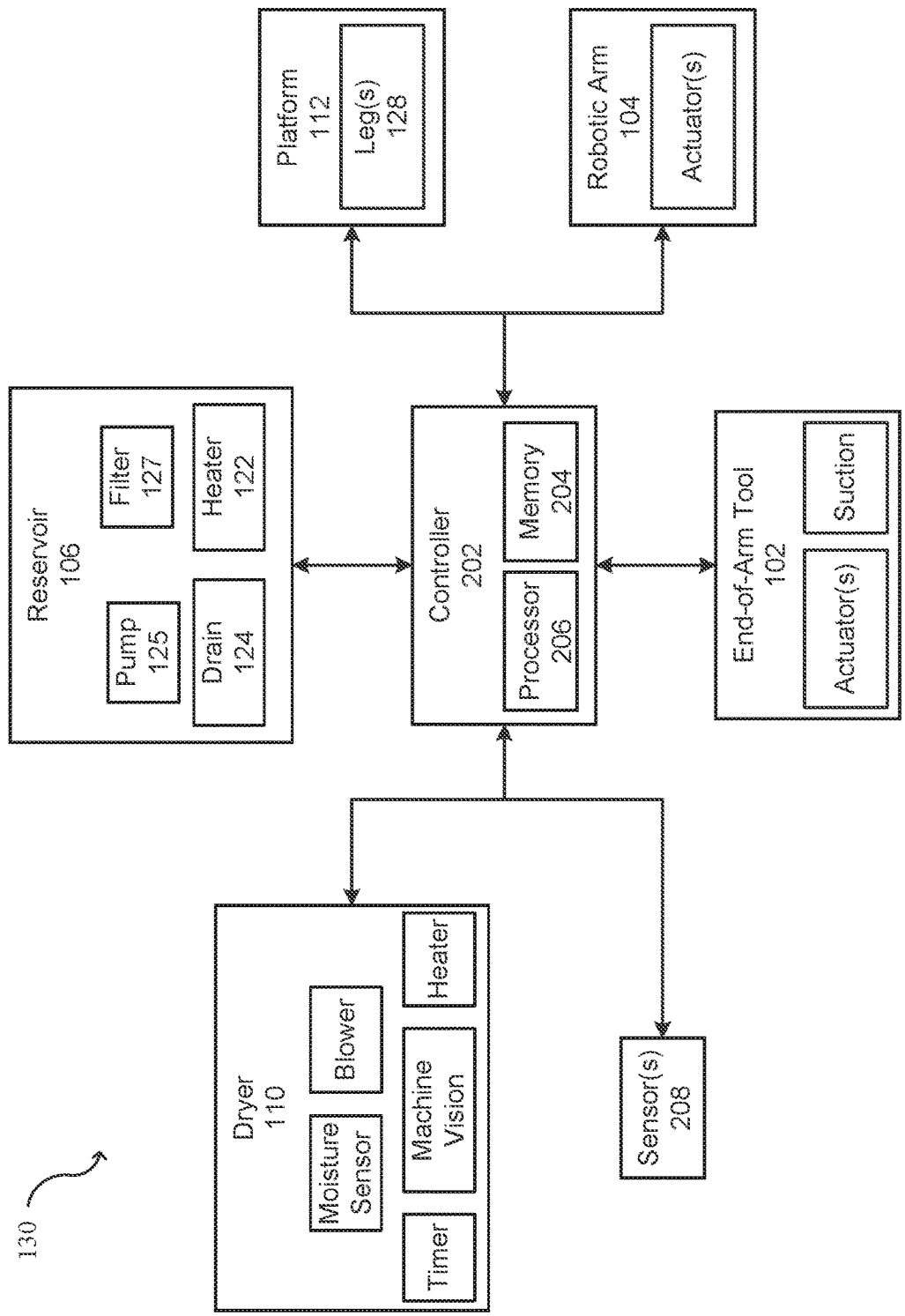
FIG. 2 is an example of a computer system for use with the end-of-arm cleaning station of FIG. 1, in accordance with at least one embodiment.

Turning to FIG. 2, a simplified schematic diagram illustrating control aspects of the computer system 130 of FIG. 1 is shown. A controller 202 can communicate information and/or instructions associated with the cleaning station 100 and/or the robotic arm 104. The controller 202 can be in communication with the robotic arm 104, the dryer 110, the end-of-arm tool 102, the platform 112, the reservoir 106, the sensor(s) 208, and/or respective components associated with such elements, such as graphically included within each element in FIG. 2. The controller 202 can communicate via a wired or wireless connection (e.g., Bluetooth). The controller 202 can include memory 204 and a processor 206. The memory 204 and the processor 206 can be included in a single structure. However, the memory 204 and processor 206 may be part of a system of multiple interconnected devices.

The memory 204 can include any type of memory device that retains stored information when powered off. The memory 204 can be or include electrically erasable and programmable read-only memory ("EEPROM"), flash memory, or any other type of non-volatile memory. In some examples, at least part of the memory 204 can include a medium from which the processor 206 can read instructions. A non-transitory computer-readable medium can include electronic, optical, magnetic, or other storage devices capable of providing the processor 206 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The processor 206 can execute instructions stored in the memory 204 to perform operations, for example, determining an item status based on item data. The processor 206 can include one processing device or multiple processing devices. Non-limiting examples of the processor 206 include a Field-Programmable Gate Array ("FPGA"), an application-specific integrated circuit ("ASIC"), a microprocessor, etc.

The controller 202 can communicate with and send instructions to the robotic arm 104, end-of-arm tool 102, dryer 110, basin 116, and/or their respective components. The controller 202 can send operating instructions to one or more of the components described herein to operate a cleaning station 100 to clean an end-of-arm tool 102 of a robotic arm 104.

In various embodiments, the controller 202 can communicate with one or more sensors 208. The sensors 208 can detect data associated with one or more components of the cleaning station 100 and/or robotic arm 104 (e.g., the end-of-arm tool 102, the reservoir 106, the platform 112, and/or the dryer 110). For example, the sensors 208 can detect data associated with the cleanliness of the end-of-arm tool 102. In various embodiments, the sensors 208 can determine when the end-of-arm tool 102 has fallen below a threshold of cleanliness during operation and needs to be put in the cleaning mode and/or when the end-of-arm tool 102 has reached a threshold of cleanliness during cleaning and can be put into the manipulation mode. The sensors 208 can additionally or alternatively measure the operation-time of the robotic arm 104 and/or the end-of-arm tool 102 (e.g., the sensors 208 can trigger cleaning of the end-of-arm tool 102 after reaching a threshold operating time, after reaching a threshold number of operating cycles, and/or after manipulating a threshold number of items).

In some embodiments, the sensor(s) 208 can be used to determine when the end-of-arm tool 102 is positioned in the drying position and/or when the end-of-arm tool 102 is dry. For example, machine vision can be used to detect when the robotic arm 104 has positioned the end-of-arm tool 102 in the drying position. The timer can be used to run the dryer 110 for a predetermined (e.g., set) amount of time. For example, the timer can be used to run the dryer for a set amount of time in a range between 10 seconds and one hour. The moisture sensor can be used to detect the amount of moisture remaining on the end-of-arm tool 102. The dryer 110 can be run until the moisture on the end-of-arm tool 102 is below a certain threshold level. The suction sensor can be used to determine if the end-of-arm tool 102 has a vacuum above a certain threshold indicative of adequate cleaning having been performed (e.g., such that the controller 202 may cause the end-of-arm tool 102 to be subjected to additional cleaning if the vacuum is below the certain threshold).

Figure 3:
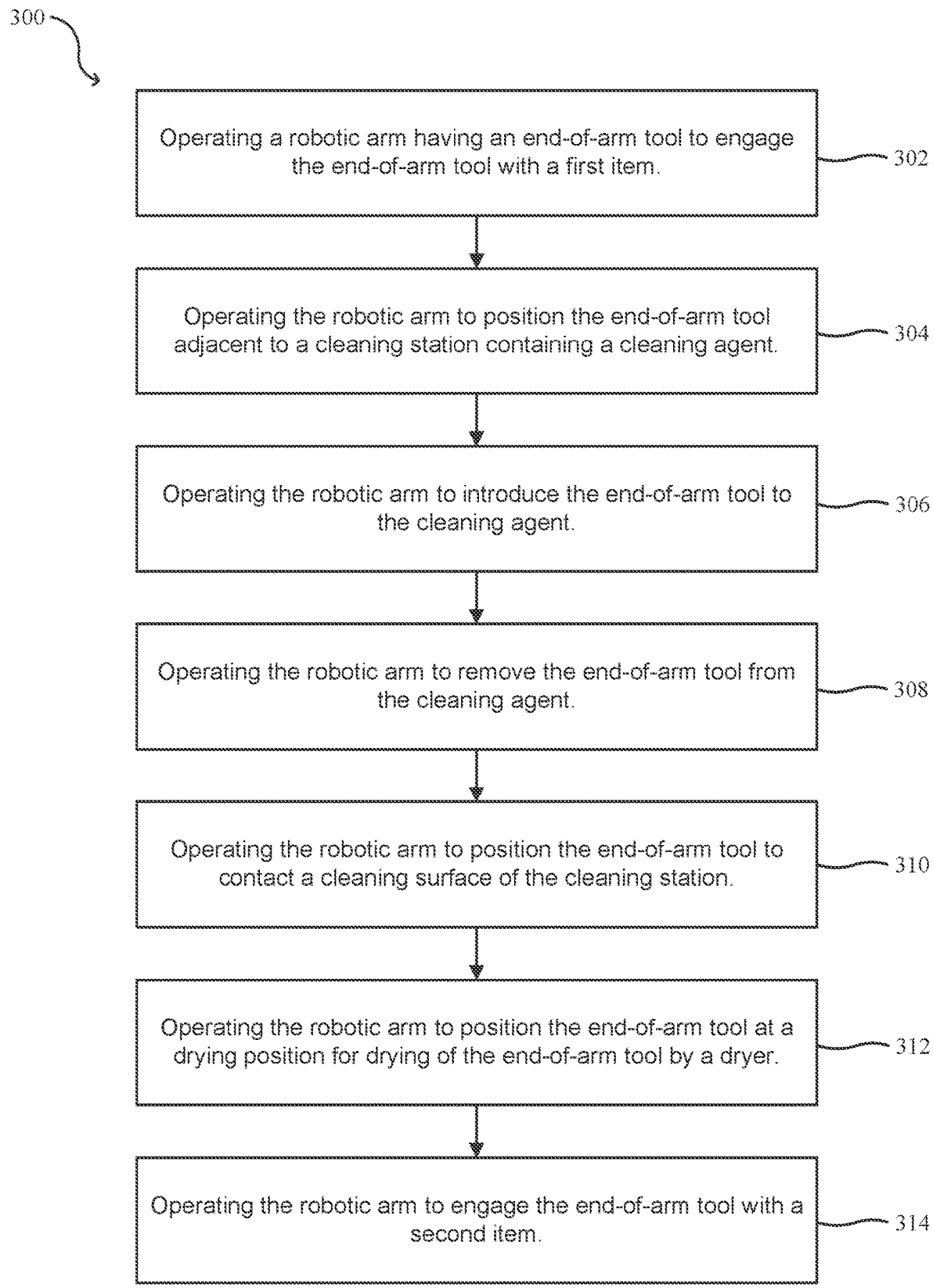
FIG. 3 is a flowchart illustrating a process for cleaning an end-of-arm tool of a robotic arm for use with the end-of-arm cleaning station of FIG. 1, in accordance with at least one embodiment.

Turning to FIG. 3, a flowchart is shown illustrating a process 300 for cleaning an end-of-arm tool of a robotic arm for use with the cleaning station 100 of FIG. 1. Various blocks of the process 300 are described by referencing the components shown in FIGS. 4 through 8, however, additional or alternative components may be used with the process.

The process 300 at block 302 can include operating a robotic arm (e.g., robotic arm 104) having an end-of-arm tool (e.g., end-of-arm tool 102) to engage the end-of-arm tool 102 with a first item. The end-of-arm tool 102 can engage with a first item in a warehouse environment. In various embodiments, the end-of-arm tool 102 can include one or more suction devices that can engage with the first item. The suction device can engage with the first item for manipulation of the first item (e.g., moving the first item around the warehouse environment).

Figure 4:
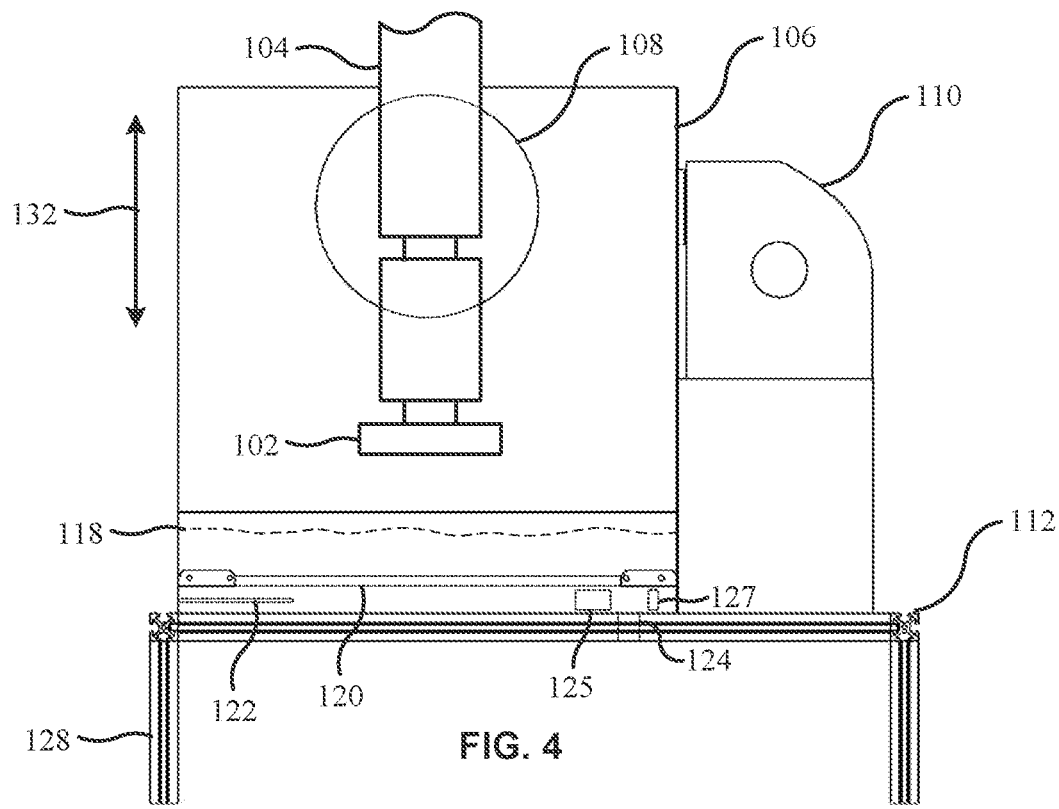
FIGS. 4 through 6 are side views that illustrate various stages or states of an end-of-arm tool of a robotic arm that can be used with particular embodiments of the end-of-arm cleaning station of FIG. 1.

The process 300 at block 304 can include operating the robotic arm 104 to position the end-of-arm tool 102 adjacent to the cleaning station 100 containing a cleaning agent (e.g., cleaning agent 118). For example, FIG. 4 shows the end-of-arm tool 102 positioned within the reservoir 106 above the surface of the cleaning agent 118. The robotic arm 104 can position the end-of-arm tool 102 by moving the end-of-arm tool 102 along direction 132 (e.g., by lowering the end-of-arm tool 102 towards the cleaning agent 118). However, the robotic arm 104 can additionally or alternatively position the end-of-arm tool 102 in the reservoir 106 through one or more openings in the walls 114. For example, the robotic arm 104 can position the end-of-arm tool 102 through an opening in a sidewall of the reservoir 106 (e.g., sideways). Positioning the end-of-arm tool 102 adjacent to the cleaning station 100 can include changing the operating mode of the robotic arm 104 from the manipulation mode to a cleaning mode. The end-of-arm tool 102 can be changed from the manipulation mode to the cleaning mode based on data detected by one or more sensors (e.g., sensors 208). For example, the end-of-arm tool 102 can be changed to the cleaning mode based on detecting that the end-of-arm tool 102 has fallen below a threshold of cleanliness, has reached a threshold operating time, and/or has completed a threshold number of operating cycles.

Figure 5:
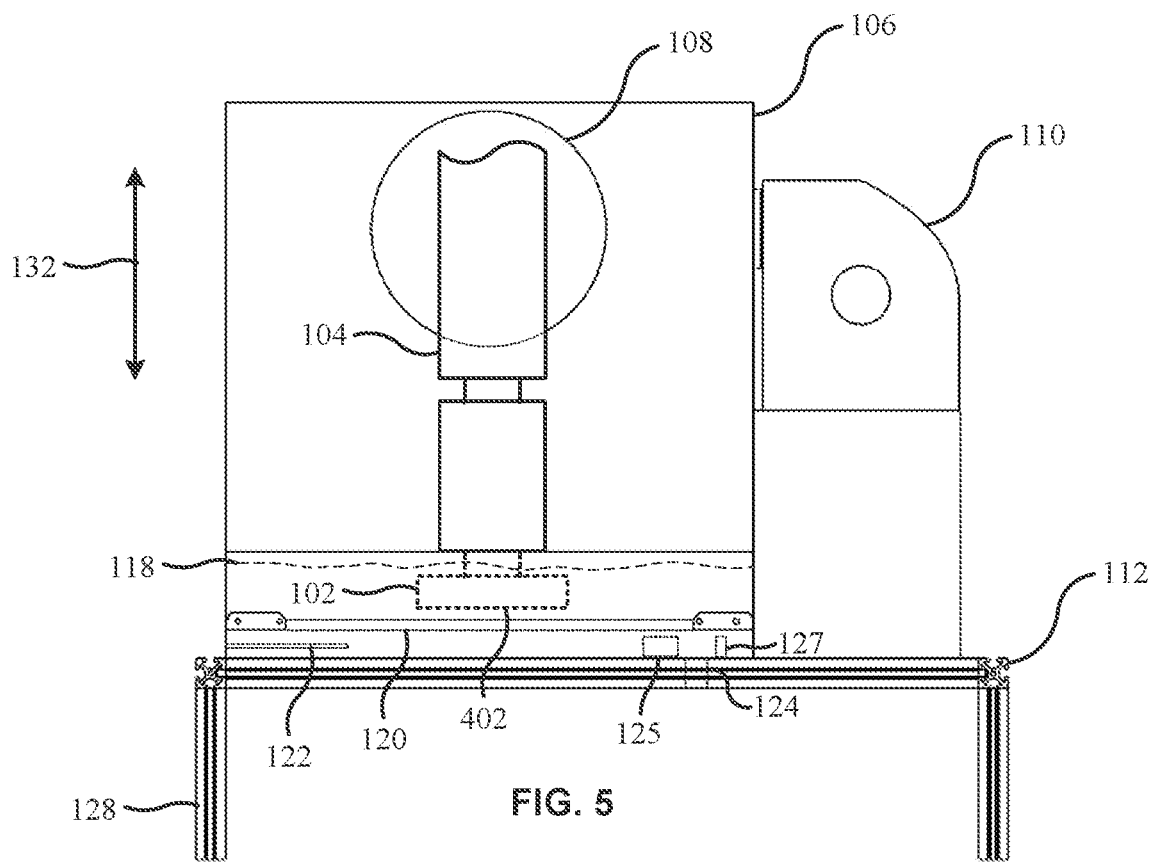

The process 300 at block 306 can include operating the robotic arm 104 to immerse the end-of-arm tool 102 (e.g., a portion of the end-of-arm tool 102) into the cleaning agent 118. For example, FIG. 5 shows the end-of-arm tool 102 immersed in the cleaning agent 118. The robotic arm 104 can immerse the end-of-arm tool 102 by moving the end-of-arm tool 102 along direction 132. The end-of-arm tool 102 is shown completely submerged in the cleaning agent 118, however, only a portion of the end-of-arm tool 102 may be submerged in the cleaning agent 118. For example, the robotic arm 104 may only submit engagement surface 402 of the end-of-arm tool 102.

In various embodiments, the end-of-arm tool 102 can remain submerged in the cleaning agent 118 until one or more conditions are met. For example, the end-of-arm tool 102 can remain submerged in the cleaning agent 118 for a predetermined amount of time, until the cleaning agent has been heated to a certain temperature (e.g., via heater 122), and/or until the cleaning agent has been emptied from the basin 116 (e.g., via drain 124). In some embodiments, the cleaning agent 118 can be circulated around the basin while the end-of-arm tool 102 is submerged in the cleaning agent 118. For example, the cleaning agent 118 can be circulated around the basin 116 via a pump 125. The cleaning agent 118 may additionally or alternatively be circulated around the basin 116 via movement (e.g., lateral and/or vertical movement) of the robot arm 104.

Figure 6:
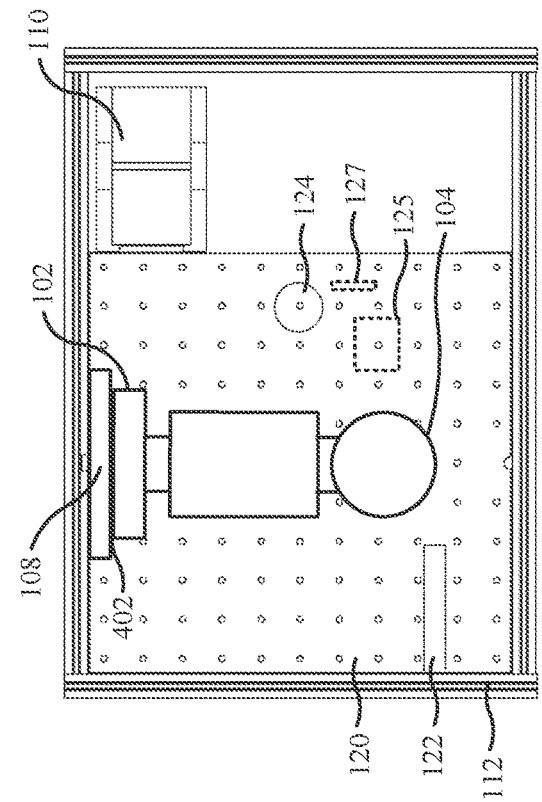

The process 300 at block 308 can include operating the robotic arm 104 to remove the end-of-arm tool 102 from the cleaning agent 118. For example, FIG. 6 shows the end-of-arm tool 102 removed from the cleaning agent 118. The robotic arm 104 can remove the end-of-arm tool along direction 132 (e.g., pull the end-of-arm tool 102 upwards); however, the robotic arm 104 can additionally or alternatively pivot to remove the end-of-arm tool 102 from the cleaning agent 118 (e.g., such as pivoting to the position shown in FIG. 7). In various embodiments, after removing the end-of-arm tool 102 from the cleaning agent 118, the process 300 can include returning to block 306 (e.g., operating the robotic arm 104 to immerse a portion of the end-of-arm tool 102 into the cleaning agent 118).

Figure 7:
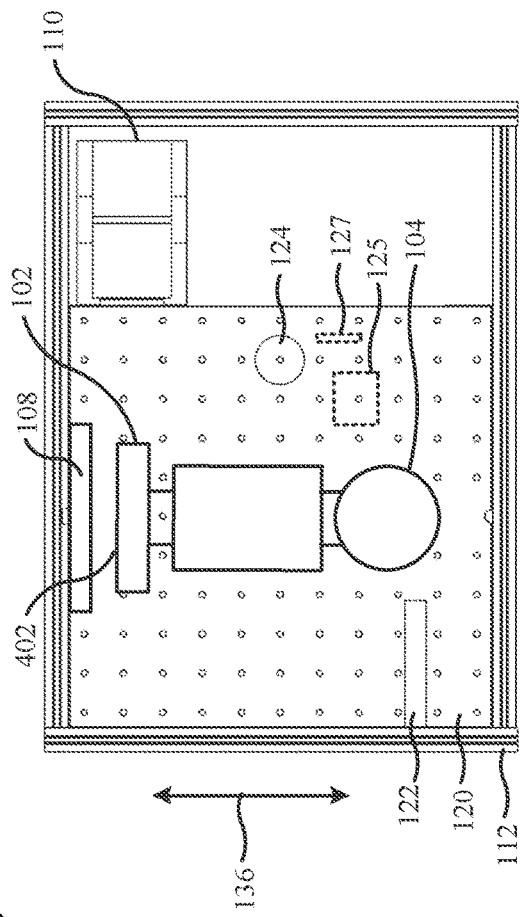
FIGS. 7 and 8 are top views that illustrate further stages or states of the end-of-arm tool of the robotic arm of FIGS. 4 through 6.

The process 300 at block 310 can include operating the robotic arm 104 to position the end-of-arm tool 102 to abrade the end-of-arm tool 102 against a cleaning surface (e.g., cleaning pad 108) of the cleaning station 100. Operating the robotic arm 104 to position the end-of-arm tool 102 can include pivoting a portion of the robotic arm 104 (e.g., along direction 134 in FIG. 1). For example, FIG. 7 shows a top view of the robotic arm 104 with the end-of-arm tool 102 in the scrubbing position. The robotic arm 104 has pivoted 90 degrees compared to FIG. 6, however, the robotic arm 104 may pivot any suitable amount (e.g., between −180 degrees and 180 degrees). The robotic arm 104 can position the end-of-arm tool 102 to engage with the cleaning pad 108. The robotic arm 104 can engage the end-of-arm tool 102 with the cleaning pad 108 and hold the end-of-arm tool 102 in a static or semi-static position. However, the robotic arm 104 may engage the end-of-arm tool 102 with the cleaning pad 108 and move the end-of-arm tool 102 relative to the cleaning pad 108 (e.g., scrubbing the end-of-arm tool 102). In some embodiments, the robotic arm 104 can hold the end-of-arm tool 102 in a static or semi-static position and the cleaning pad 108 can move relative to the end-of-arm tool 102.

Figure 8:
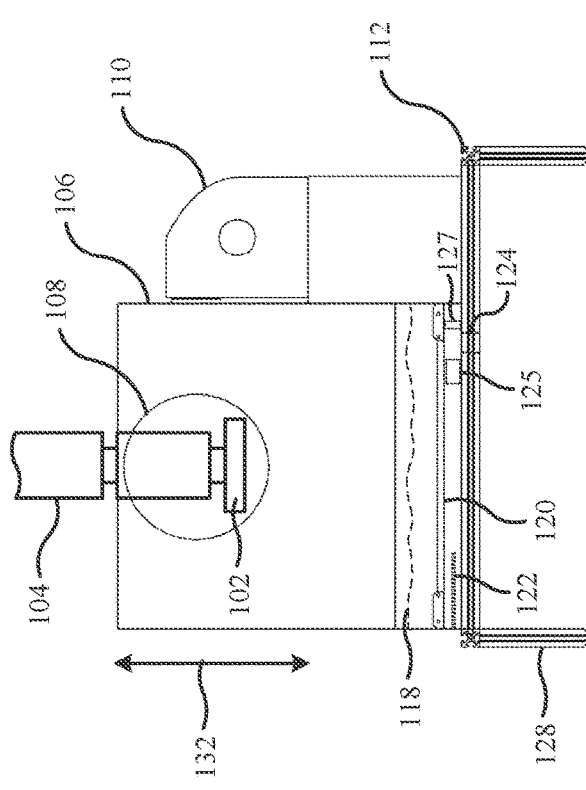

The process 300 at block 312 can include operating the robotic arm 104 to position the end-of-arm tool 102 at a drying position. Placement in the drying position may facilitate drying of the end-of-arm tool 102 by a dryer (e.g., dryer 110). For example, FIG. 8 shows a top view of the robotic arm 104 with the end-of-arm tool 102 in the drying position. The robotic arm 104 can move the end-of-arm tool 102 to the drying position along direction 136 (e.g., by moving the engagement surface 402 of the end-of-arm tool 102 away from the cleaning pad 108). However, the end-of-arm tool 102 can be positioned in the drying position with the engagement surface 402 of the end-of-arm tool 102 engaged with the cleaning pad 108. In the drying position, the dryer 110 can dry the end-of-arm tool 102. However, the robotic arm 104 may hold the end-of-arm tool 102 in a static or semi-static position until the end-of-arm tool 102 is dry (e.g., allowing the end-of-arm tool 102 to drip-dry or air dry, such as by passive evaporation).

The process 300 at block 314 can include operating the robotic arm 104 to engage the end-of-arm tool 102 with a second item. For example, the robotic arm 104 can be returned to a manipulation mode for engagement of the end-of-arm tool 102 with the second item. The end-of-arm tool 102 can be changed from the cleaning mode to the manipulation mode based on data detected by sensors 208. For example, the end-of-arm tool 102 can be changed to the manipulation mode based on detecting that the end-of-arm tool 102 has reached a threshold of cleanliness, has reached a threshold drying time, and/or has completed a threshold number of cleaning cycles.

In various embodiments, one or more blocks (e.g., blocks 302, 304, 306, 308, 310, 312, and/or 314) can be repeated in an iterative process. For example, blocks 306 and 308 can be repeated multiple times (e.g., to repeatedly submerge the end-of-arm tool 102 in the cleaning agent 118). Similarly, blocks 310 and 308 can be repeated in an iterative process. For example, the end-of-arm tool 102 can be engaged with the cleaning pad 108 and then re-submerged in the cleaning agent 118 before being re-engaged with the cleaning pad 108. One or more of the blocks may be repeated based on data detected by one or more sensors (e.g., sensors 208). For example, sensors 208 can detect that there is still contamination on the end-of-arm tool 102 and the controller 202 can send instructions to the robotic arm 104 to repeat blocks 306 and/or 308 (e.g., re-submerge the end-of-arm tool 102 in the cleaning agent 118).

In various embodiments, the blocks (e.g., blocks 302, 304, 306, 308, 310, 312, and/or 314) of process 300 can be performed in various orders. For example, the process 300 can include performing block 310 (e.g., positioning the end-of-arm tool 102 to abrade the end-of-arm tool 102 against the cleaning pad 108) prior to performing block 306 (e.g., operating the robotic arm 104 to immerse the end-of-tool 102 into the cleaning agent 118). However, the blocks (e.g., blocks 302, 304, 306, 308, 310, 312, and/or 314) of process 300 can be performed in any suitable order.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of robotic arm cleaning, the method comprising:
   operating, in a manipulation mode, a robotic arm having an end-of-arm tool to grip a first item with the end-of-arm tool;
   operating, in a cleaning mode, the robotic arm to position the end-of-arm tool adjacent to a cleaning station, the cleaning station comprising a basin formed by walls including a bottom wall and one or more side walls, the basin containing a cleaning agent, the cleaning station further comprising a stationary cleaning surface positioned in the basin and positioned on or along a wall of the basin;
   operating the robotic arm to immerse a portion of the end-of-arm tool into the cleaning agent in the basin of the cleaning station;
   operating the robotic arm to remove the portion of the end-of-arm tool from the cleaning agent;
   operating the robotic arm to scrub the portion of the end-of-arm tool against the stationary cleaning surface positioned in the basin of the cleaning station; and
   operating the robotic arm to position the portion of the end-of-arm tool at a drying position in the basin for drying of the portion of the end-of-arm tool by a dryer of the cleaning station.

2. The method of claim 1, further comprising operating, in the manipulation mode, the robotic arm to grip a second item with the end-of-arm tool.

3. The method of claim 1, wherein operating the robotic arm to immerse the portion of the end-of-arm tool comprises submerging the portion of the end-of-arm tool below a surface of the cleaning agent for a predetermined amount of time.

4. The method of claim 1, wherein prior to operating the robotic arm to scrub of the end-of-arm tool against the stationary cleaning surface, the method further comprising operating the robotic arm to re-immerse the portion of the end-of-arm tool into the cleaning agent.

5. The method of claim 1, wherein in the drying position the portion of the end-of-arm tool is engaged with the cleaning surface of the cleaning station.

6. The method of claim 1, wherein the dryer comprises at least one of a blower or slats positioned in the cleaning station, the slats defining openings allowing air to flow into the cleaning station.

7. A method comprising:
   operating, in a manipulation mode, a robotic arm having an end-of-arm tool to grip a first item with the end-of-arm tool;
   operating, in a cleaning mode, the robotic arm to position the end-of-arm tool at a cleaning station, the cleaning station comprising a basin formed by walls including a bottom wall and one or more side walls, the basin including a reservoir containing a cleaning agent, the cleaning station further comprising a cleaning surface positioned in the basin and positioned on or along a wall of the basin;
   positioning the end-of-arm tool of the robotic arm at an introduction position in the basin with a portion of the end-of-arm tool in contact with the cleaning agent contained within the reservoir of the cleaning station;
   positioning the end-of-arm tool at a scrubbing position in the basin with the portion of the end-of-arm tool in contact with the cleaning surface of the cleaning station; and
   positioning the end-of-arm tool at a drying position for drying the portion of the end-of-arm tool.

8. The method of claim 7, wherein drying the portion of the end-of-arm tool comprises drying the portion of the end-of-arm tool by a dryer of the cleaning station.

9. The method of claim 8, wherein drying the portion of the end-of-arm tool by the dryer comprises directing air toward the portion of the end-of-arm tool for a set amount of time.

10. The method of claim 9, wherein prior to positioning the end-of-arm tool at the introduction position, the method further comprises engaging the end-of-arm tool with a second item.

11. The method of claim 7, wherein positioning the end-of-arm tool at the scrubbing position comprises removing the portion of the end-of-arm tool from the cleaning agent in a first direction and contacting the portion of the end-of-arm tool with the cleaning surface in a second direction different from the first direction.

12. The method of claim 7, wherein prior to positioning the end-of-arm tool of the robotic arm at the introduction position, the method further comprises heating the cleaning agent contained within the reservoir.

13. The method of claim 7, wherein the cleaning agent is a first cleaning agent and the method further comprises, removing the first cleaning agent from the reservoir and adding a second cleaning agent to the reservoir.

14. A method comprising:
  positioning an end-of-arm tool of a robotic arm at an introduction position with a portion of the end-of-arm tool in contact with a cleaning agent contained within a reservoir of a cleaning station, the end-of-arm tool being configured to grip a first item;
  positioning the end-of-arm tool at a scrubbing position and operating the robotic arm to impart a scrubbing motion with the portion of the end-of-arm tool in contact with and scrubbing against a stationary cleaning surface of the cleaning station; and
  positioning the end-of-arm tool at a drying position for drying the portion of the end-of-arm tool.

15. The method of claim 14, wherein the end-of-arm tool comprises a suction cup, a vacuum, a soft robot, a rubberized gripper, or an inflatable bag.

16. The method of claim 1, wherein the end-of-arm tool comprises a suction cup, a vacuum, a soft robot, a rubberized gripper, or an inflatable bag.

17. The method of claim 7, wherein the end-of-arm tool comprises a suction cup, a vacuum, a soft robot, a rubberized gripper, or an inflatable bag.

18. The method of claim 7, wherein the cleaning surface is coupled to a moveable base operable to move the cleaning surface relative to the end-of-arm tool.

19. The method of claim 7, wherein the drying position is in the basin.

20. The method of claim 7, wherein the cleaning surface is positioned beneath the cleaning agent.

* * * * *